US011420262B2

(12) United States Patent
Lakshman et al.

(10) Patent No.: US 11,420,262 B2
(45) Date of Patent: Aug. 23, 2022

(54) SYSTEMS AND METHODS FOR CO-CASTING OF ADDITIVELY MANUFACTURED INTERFACE NODES

(71) Applicant: DIVERGENT TECHNOLOGIES, INC., Los Angeles, CA (US)

(72) Inventors: Narender Shankar Lakshman, Torrance, CA (US); Broc William TenHouten, Rancho Palos Verdes, CA (US); Kevin Robert Czinger, Santa Monica, CA (US); Antonio Bernerd Martinez, El Segundo, CA (US); Jon Paul Gunner, Palos Verdes Estates, CA (US); Muhammad Faizan Zafar, Long Beach, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 412 days.

(21) Appl. No.: 15/885,350

(22) Filed: Jan. 31, 2018

(65) Prior Publication Data

US 2019/0232368 A1 Aug. 1, 2019

(51) Int. Cl.
*B22D 19/00* (2006.01)
*B33Y 80/00* (2015.01)
(Continued)

(52) U.S. Cl.
CPC .............. *B22F 12/00* (2021.01); *B22D 19/00* (2013.01); *B22D 19/04* (2013.01); *B32B 15/01* (2013.01);
(Continued)

(58) Field of Classification Search
CPC ...... B22D 19/00; B22D 19/04; B22D 19/045; B22D 19/10
See application file for complete search history.

(56) References Cited

U.S. PATENT DOCUMENTS 5,203,226 A 4/1993 Hongou et al.
5,742,385 A 4/1998 Champa
(Continued)

FOREIGN PATENT DOCUMENTS

DE 102016211358 A1 12/2017
EP 2551041 A2 1/2013
(Continued)

OTHER PUBLICATIONS

US 9,202,136 B2, 12/2015, Schmidt et al. (withdrawn)
(Continued)

*Primary Examiner* — Adam Krupicka
(74) *Attorney, Agent, or Firm* — ArentFox Schiff LLP

(57) ABSTRACT

Systems and methods for co-casting of additively manufactured, high precision Interface Nodes are disclosed. The Interface Node includes an integrated structure including one or more complex or sophisticated features and functions. Co-casting of Interface Nodes by casting a part onto the Interface Node results in a hybrid structure comprising the cast part and the additively manufactured Interface Node. The interface node may include at least one of a node-to-tube connection, node-to-panel connection, or a node-to-extrusion connection. In an embodiment, engineered surfaces may be provided on the Interface Node to improve the blend between the Interface Node and the cast part during the co-casting process.

22 Claims, 13 Drawing Sheets

(51) Int. Cl.
  *B22F 12/00* (2021.01)
  *B32B 15/01* (2006.01)
  *B33Y 30/00* (2015.01)
  *B33Y 40/00* (2020.01)
  *B33Y 10/00* (2015.01)
  *B22D 19/04* (2006.01)
  *B22F 10/10* (2021.01)

(52) U.S. Cl.
  CPC .............. *B33Y 10/00* (2014.12); *B33Y 30/00* (2014.12); *B33Y 40/00* (2014.12); *B33Y 80/00* (2014.12); *B22F 10/10* (2021.01)

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |

(56) References Cited

U.S. PATENT DOCUMENTS

| | | |
|---|---|---|
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |

(56) References Cited

U.S. PATENT DOCUMENTS

| | | |
|---|---|---|
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0065383 A1 | 3/2006 | Ortiz et al. |
| 2006/0108783 A1 | 5/2006 | Ni et al. |
| 2010/0006252 A1 | 1/2010 | Roby |
| 2014/0277669 A1 | 9/2014 | Nardi et al. |
| 2015/0246391 A1 | 9/2015 | Andreussi et al. |
| 2016/0129417 A1 | 5/2016 | Aimone et al. |
| 2016/0145961 A1* | 5/2016 | Yu ................ E21B 33/1208 166/179 |
| 2016/0151829 A1 | 6/2016 | Propheter-Hinckley et al. |
| 2017/0113344 A1 | 4/2017 | Schönberg |
| 2017/0246677 A1* | 8/2017 | Bunker ................ B22D 25/02 |
| 2017/0341309 A1 | 11/2017 | Piepenbrock et al. |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Apr. 19, 2019, regarding PCT/US2018/065167.
Supplementary European Search Report issued for corresponding application EP 18904228, dated Aug. 27, 2021.
An English language machine translation of DE102016211358A1.

* cited by examiner

SYSTEMS AND METHODS FOR CO-CASTING OF ADDITIVELY MANUFACTURED INTERFACE NODES

BACKGROUND

Field

The present disclosure relates generally to apparatus and techniques in manufacturing, and more specifically to co-casting of interface nodes for three-dimensional (3-D) printed components for use in producing vehicles, boats, aircraft and other mechanical structures.

Background

Three-dimensional (3-D) printing, which may also be referred to as additive manufacturing, is a process used to create 3-D objects. The 3-D objects may be formed using layers of material based on digital model data of the object. A 3-D printer may form the structure defined by the digital model data by printing the structure one layer at a time. 3-D printed objects may be almost any shape or geometry.

A 3-D printer may disseminate a powder layer (e.g., powdered metal) on an operating surface. The 3-D printer may then bond particular areas of the powder layer into a layer of the object, e.g., by using a laser to bond the powder of the powder layer together. The steps may be repeated to sequentially form each layer. Accordingly, the 3-D printed object may be built layer by layer to form the 3-D object.

3-D printing is non-design specific, which offers geometric and design flexibility that conventional manufacturing processes cannot. Furthermore, 3-D printing technologies can produce parts with very small feature sizes, and geometries that are either significantly difficult or impossible to produce using conventional manufacturing processes.

Very large components which exceed printer size specifications can be segregated at the design phase, printed in parallel and combined. The versatility of 3D printing, and its ability to create highly complex structures, is driving its increased adoption by the industry.

However, as the sophistication of the features of the 3-D printed part increases, the production volume would decrease. The production volume also decreases with the increasing size of the 3-D printed component. These practical limitations are often inherent in certain 3-D printing processes, which may rely on slower printing speeds for accurate rending of complex geometries.

Casting is a conventional manufacturing process that is well suited for high throughput production of voluminous or heavy structures. However, casting is not suitable for high-throughput production of more complex structures, which include structures with sophisticated internal features and other complex geometrical features. A significant amount of post-machining operations would be needed after the casting process, which would make the overall process prohibitively expensive for high-volume production of such complex structures relying solely on casting.

Techniques are consequently needed for integrating the benefits of AM and its ability to create complex structures with sophisticated features on one hand, with the advantages of casting, a higher-throughput manufacturing technique to effect decreased lead times and increased production capacities on the other hand, to thereby enable the manufacture of structures that enjoy the combined benefits of both.

3-D printed components may be used to produce sub-components for various devices or apparatus. The 3-D printed sub-components may need to be attached or connected to other sub-components, including other 3-D printed sub-components, extruded sub-components, or still other sub-components.

SUMMARY

Several aspects of apparatus for co-casting of interface nodes will be described more fully hereinafter with reference to three-dimensional printing techniques.

One aspect is an apparatus including an additively manufactured node. The apparatus also includes a cast part. The cast part may be cast onto the additively manufactured node. Accordingly, the apparatus may be a hybrid part. The hybrid part may include the additively manufactured node and the cast part.

It will be understood that other aspects of apparatus for co-casting of interface nodes will become readily apparent to those skilled in the art from the following detailed description, wherein it is shown and described only several embodiments by way of illustration. As will be realized by those skilled in the art, the apparatus for bridging are capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of apparatus for bridging will now be presented in the detailed description by way of example, and not by way of limitation, in the accompanying drawings, wherein.

DETAILED DESCRIPTION

Figure 1A:
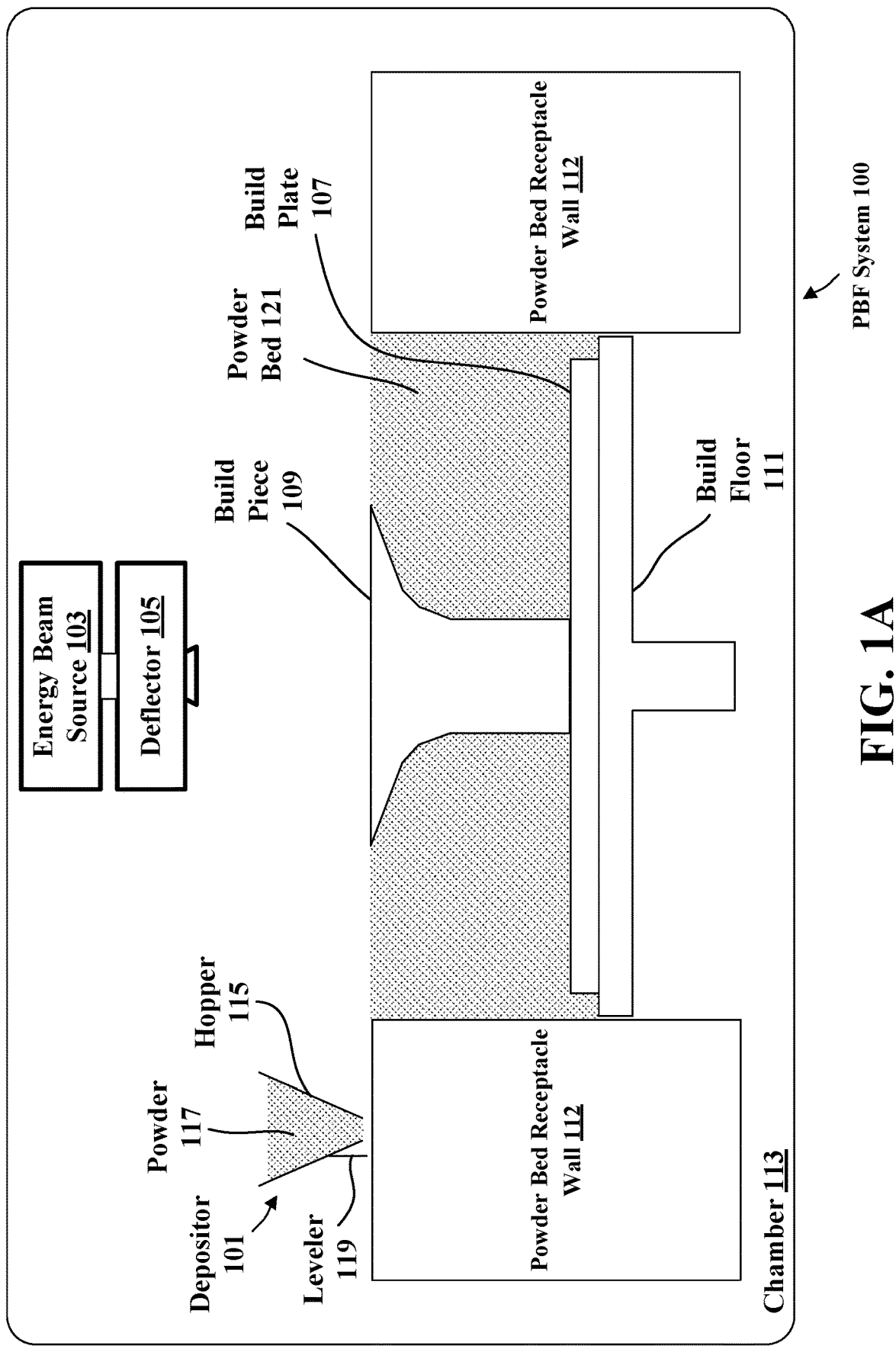
FIGS. 1A-D illustrate respective side views of an exemplary 3-D printer system.

The detailed description set forth below in connection with the appended drawings is intended to provide a description of various exemplary embodiments of apparatus for co-casting of interface nodes with 3-D printed components and is not intended to represent the only embodiments in which the invention may be practiced.

This disclosure is generally directed to Interface Nodes, which connect to cast components. The Interface Nodes may have high precision features or complex geometries that allow them to perform specific functions, including creating connections to spanning structures such as tubes, structural panels, extrusions, sheet metal, and other structural members. Stated differently, Interface Nodes are structures that incorporate one or more high precision features and that connect to other cast components to form a versatile and efficient arrangement of functional parts.

The Interface Nodes architecture may use a variety of connection features to enable coupling of the Interface Node to other components. The use of Interface Nodes to connect together preconfigured networks of cast components and spanning structures in a transport structure or other mechanized assembly has numerous advantages. Among others, the architecture disclosed in the aspects herein can streamline the manufacturing process by increasing production volume of both high-precision and lower precision parts while decreasing production costs. The Interface Nodes architecture is also robust, compact, and inherently reliable, and can therefore increase overall product quality.

Interface Nodes are generally high precision structures, meaning that they may incorporate one or more complex features and functions as described herein. These features and functions, often compactly integrated into the Interface Nodes, may be defined by numerous physical properties and characteristics. Being an often complex consolidation of structures integrated into a single component, the Interface Node may include both intricate connection features and sophisticated functional capabilities. These features and capabilities enable the Interface Node to seamlessly connect with larger, cast components without requiring a significant sacrifice in production throughput. Specifically, from the two components, the size of the Interface Node is reduced compared to the other component, or cast component in this case; to consume mass, and to reduce material consumption while printing the Interface Node.

The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing may provide significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that may not be possible to manufacture via traditional manufacturing processes or may be cost prohibitive to manufacture via traditional manufacturing processes. As discussed above, the 3-D printed sub-components may need to be attached or connected to other sub-components, including other 3-D printed sub-components, extruded sub-components, or still other sub-components.

In an aspect, an interface node may be co-cast to include galvanic corrosion protection features. For example, sealants and other isolators may be used for galvanic protection. Sealants provide a hermetically sealed environment for adhesive connections between the IN and the tube/panel/extrusion. Additionally, they provide isolation by preventing physical contact between the two components, thereby reducing or eliminating the possibility of galvanic corrosion. In an aspect, however, the galvanic corrosion protection features, are not in the co-cast region. Rather, the galvanic corrosion protection features may be at an interface connecting to tubes, panels, extrusions, or other types of interface points.

FIGS. 1A-D illustrate respective side views of an exemplary 3-D printer system. In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls 112 of the powder bed receptacle generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
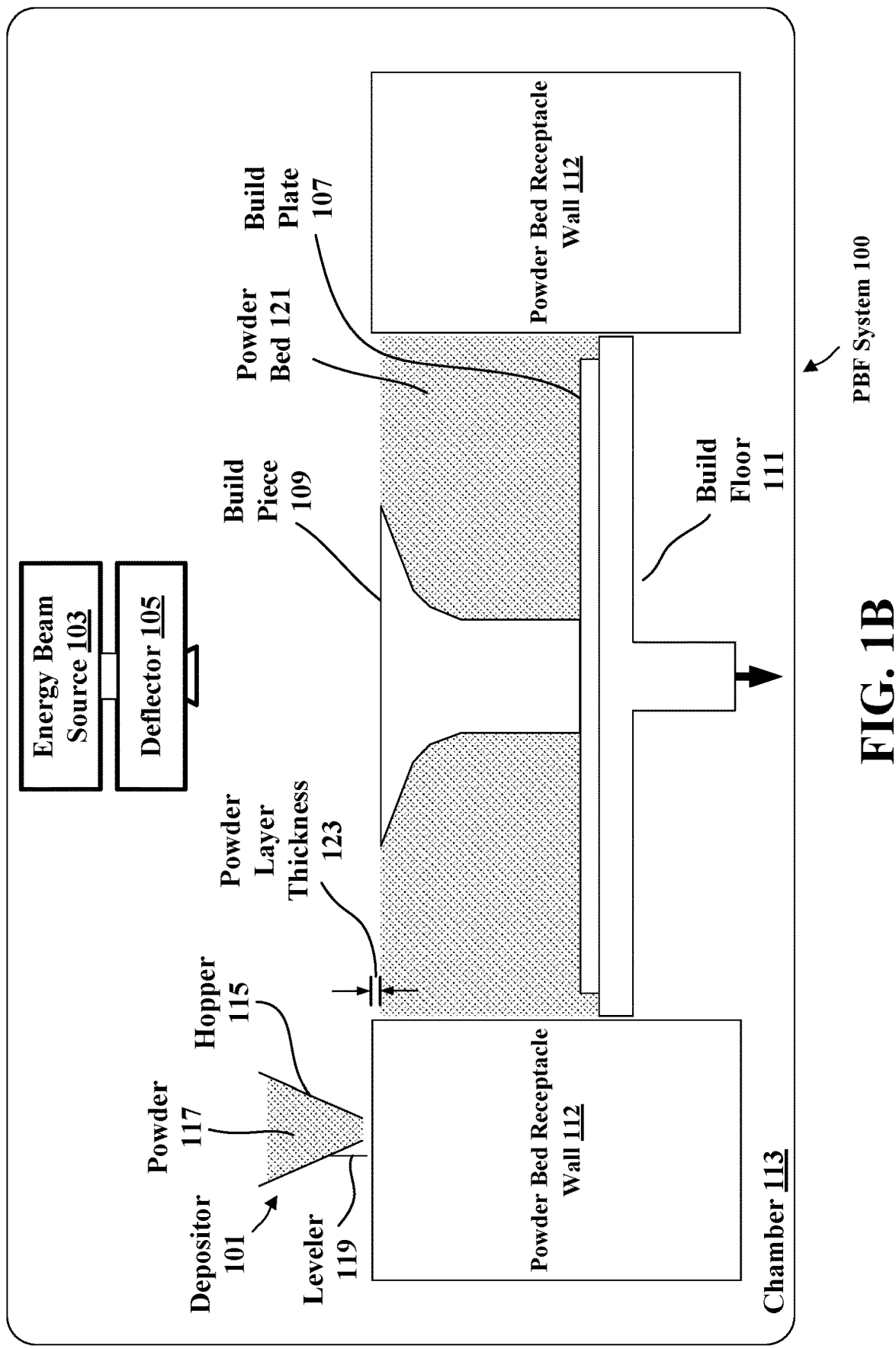

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
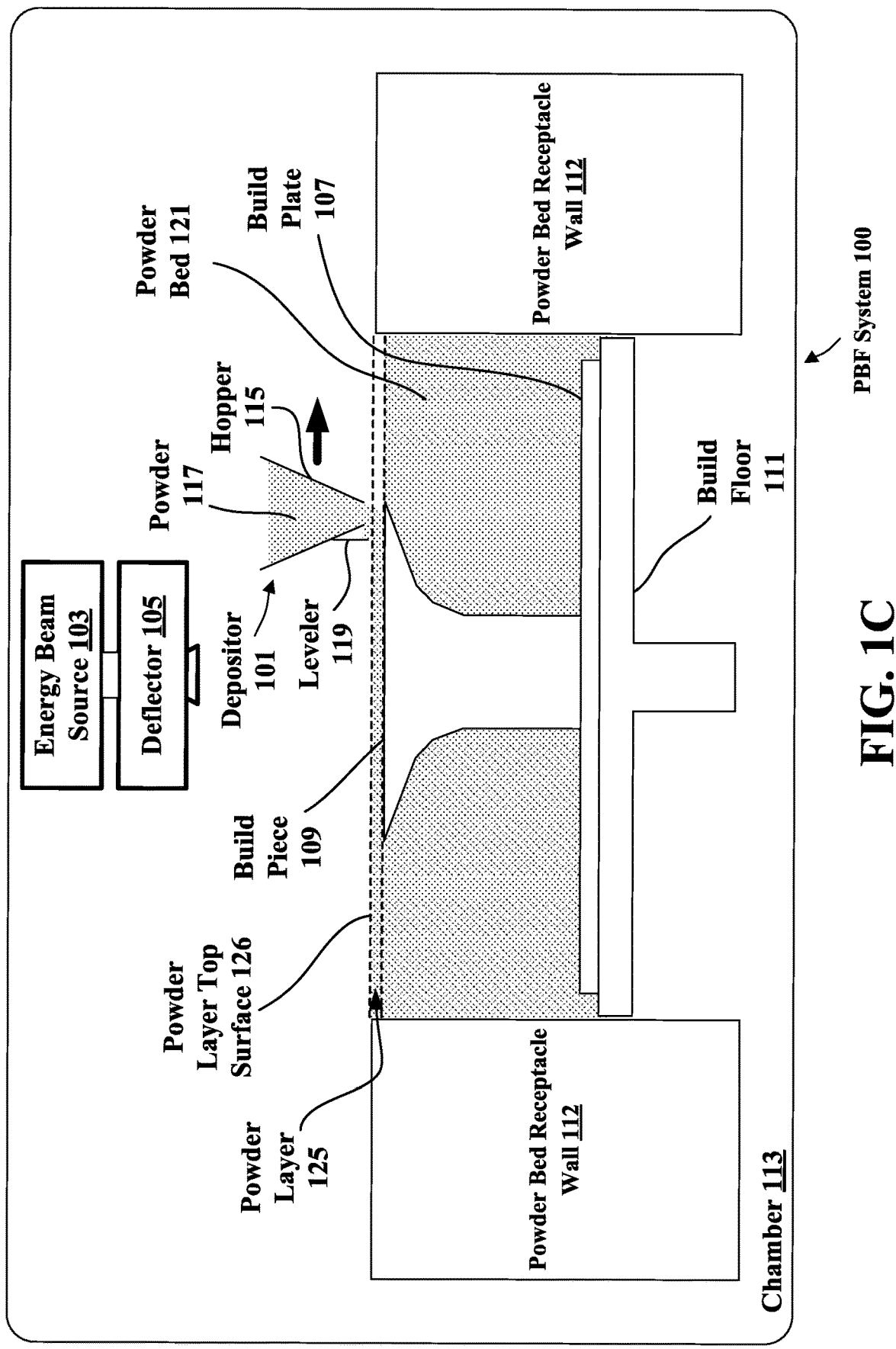

FIG. 1C shows PBF system 100 at a stage in which depositor 101 is positioned to deposit the powder 117 in a space created over the top surfaces of build piece 109 and powder bed 121 and bounded by powder bed receptacle walls 112. In this example, depositor 101 progressively moves over the defined space while releasing the powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B) is greater than an actual thickness used for the example involving 150 previously-deposited layers discussed above with reference to FIG. 1A.

Figure 1D:
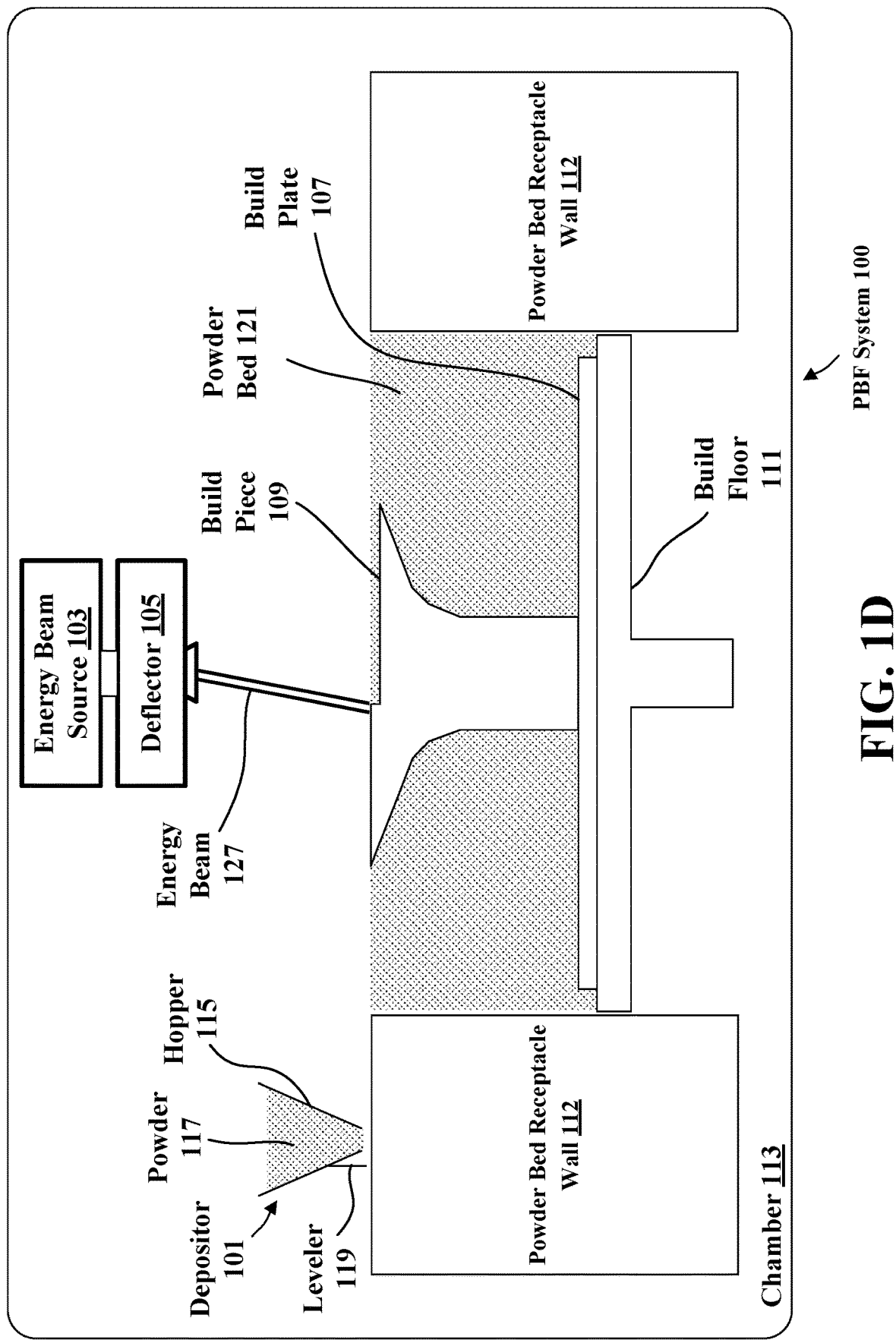

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case, energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case, the energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

In an aspect, interface nodes may be manufactured through PBF and other additive manufacturing (AM) processes that may result in parts with small feature size and accurate prints. While PBF and the other AM processes used to manufacture interface nodes may offer a great degree of accuracy and the flexibility to fabricate parts with a plurality of incredibly complex features, PBF and the other AM processes may not be ideal for high throughput production. Therefore, structures that enable connection to the interface nodes may be developed to combine the great degree of accuracy and the flexibility to fabricate parts with a plurality of incredibly complex features using PBF and the other AM processes with other conventional processes. Nodes made using PBF and other AM process may connect to other structures (e.g., tubes, extrusions, panels, or other conventionally manufactured processes). Such a node may be connected to the other structures (e.g., tubes, extrusions, panels, or other conventionally manufactured processes).

Figure 2:
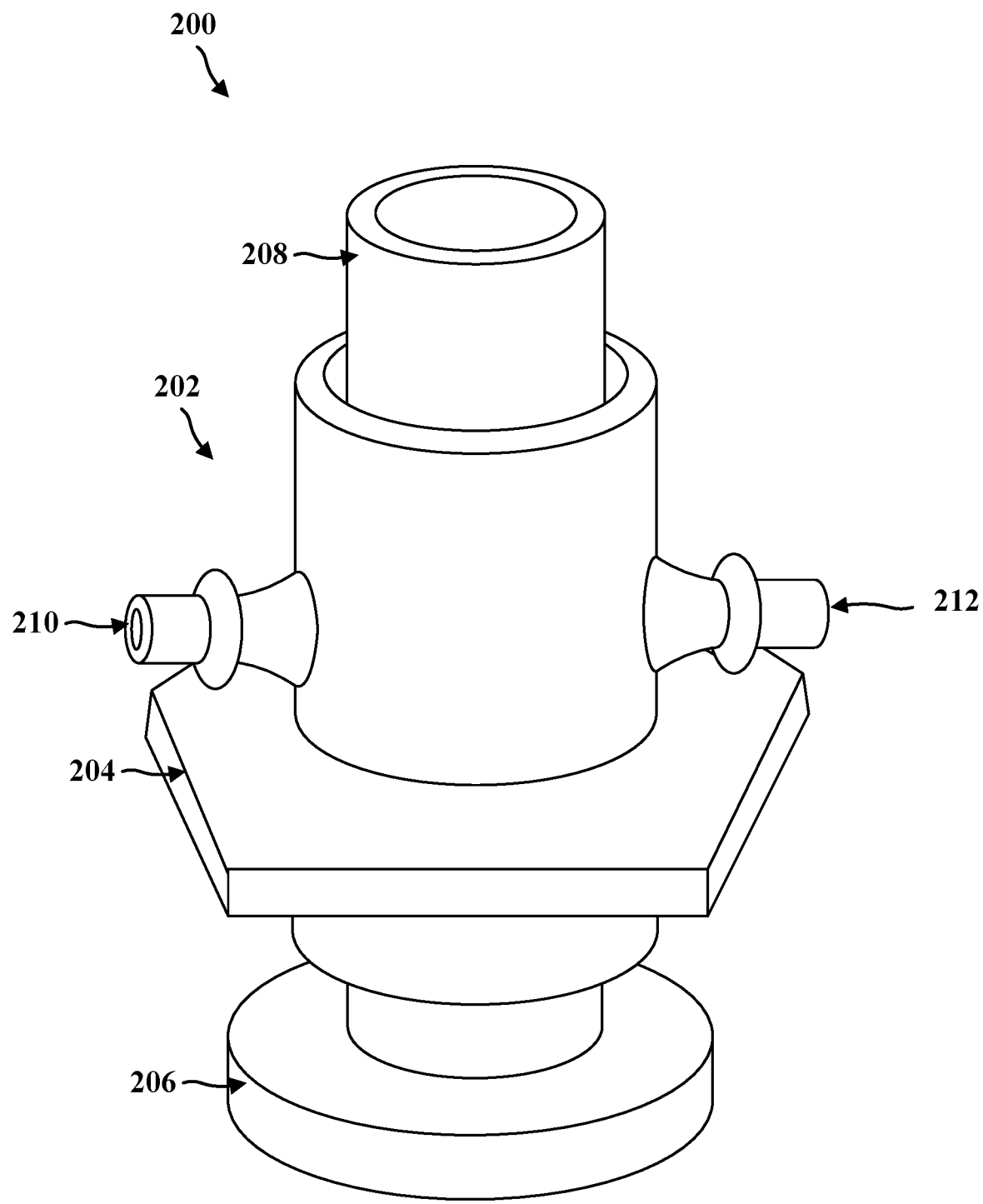
FIG. 2 is a diagram illustrating an example node that may be a co-casting.

FIG. 2 is a diagram illustrating an example node 200 that may be a co-casting. As illustrated, an additively manufactured component 202 may include co-cast components 206. The co-cast component 206 may in some aspects, form the node 200. The node 200 may be an additively manufactured node 202 that connects to other structures in a vehicle chassis or other higher level assembly (e.g., a tube 208). Other structures (e.g., a tube 208) may connect to the additively manufactured node 202. The other structures (e.g., a tube 208) may include structural tubes (carbon fiber composite, metal, alloys, and those made of other engineering materials), extrusions, panels, sheet metals, castings and other machined components (not illustrated). Machining may include milling, boring, tapping, grinding, or other types of machining.

The additively manufactured component 202 may be placed in a casting mold. (See FIGS. 5-7 for examples of casting molds.) In an aspect, the additively manufactured component 202 may be secured to the casting mold such that the node 200 (e.g., additively manufactured component 202) is constrained, e.g., unable to move or rotate during the casting process. For example, the node 200 may be constrained be the shape of the node 200 or an anti-rotation feature 204 of the node 200, e.g., on the additively manufactured component 202 of node 200. (For example, the node 200 may have a hexagonally shaped base that may form the anti-rotation feature 204.)

In an aspect, the casting mold accepts the additively manufactured component 202). In an aspect, the additively manufactured component 202 may be an interface node. The node 200 (e.g., additively manufactured component 202) may be placed in a mold configured to accept the node 200 (e.g., additively manufactured components 202). The node 200 may have a co-casting region 206. The co-cast region 206 refers to the part of the node 200 that would cooperate with the casting cavity to form a part. The co-cast region 206 could be fins or fingers extending into the cast cavity to increase the surface area of the joint between the node and the casting. These features, additionally, could serve as structures for optimal load or heat transfer into the cast part. Therefore, all the complexity could be built into the node while the casting could be a part with a simple geometry. Furthermore, the increased surface area of the node can improve the blend between the node and the cast part. The increased surface area may be provided by an engineered surface. The engineered surfaces may be shapes other than flat surfaces. Engineered surfaces may be provided in lieu of flat surfaces.

In an aspect for this process, the melting point/glass transition temperature (e.g., for plastics) of the node 200 (e.g., additively manufactured component 202) may be higher than that of the material being cast. In an aspect, the additively manufactured components 202 may be secured to the mold using mechanical fastening features.

In an aspect, the node may have stand-off tabs that would enable the node to be fixtured in place during the casting process. For example, the anti-rotation feature 204 may also function as a stand-off tab. The node may have other features for fixturing during the casting process. In an aspect, the other features may include pins (e.g., anti-rotation feature 204) or grooves to accept pins/tongues. The pins/tongues may additionally serve as locating features to locate the node in the mold (e.g., either on the exterior of the mold or the interior).

The additively manufactured components 202 may be an Interface Node. As illustrated in FIG. 2, the additively manufactured components 202 includes the adhesive inlet port 210, the adhesive outlet port 212, and sealants. In an embodiment, the adhesive outlet port 212 may be connected to a negative pressure source (such as a vacuum source), to promote adhesive distribution during the injection process. In addition, grooves or other features may be provided on the additively manufactured components 202 (e.g., Interface Node) to accept sealants, and other isolators. Sealants may be used to provide a hermetically sealed enclosure for the adhesive introduction, and would further ensure the integrity of the adhesive once it has cured. Sealants also ensure that the additively manufactured components 202 and the component the additively manufactured components 202 is being connected to do not come under physical contact, thereby preventing potential galvanic corrosion issues. In some cases, features to accept isolators may be co-printed with the additively manufactured components 202. The isolators would ensure that the additively manufactured components 202 and the component being connected to the additively manufactured components 202 do not come in physical contact with each other, thereby preventing galvanic corrosion. In an aspect, nylon washers may be used as isolators.

While a node to tube 208 connection is illustrated on additively manufactured components 202, it will be appreciated by those skilled in the art that any connection feature may be present on the additively manufactured components 202, as mandated by the requirements of a particular design. For example, the additively manufactured components 202 (e.g., Interface Node) may have a node to panel connection feature or other types of connections.

Co-casting of Interface Nodes may allow designs to realize multi-material connections. Without Interface Nodes, cast components might have to undergo prohibitively expensive and time-consuming machining operations to obtain the intricate features to realize robust, multi-material connections.

Figure 3:
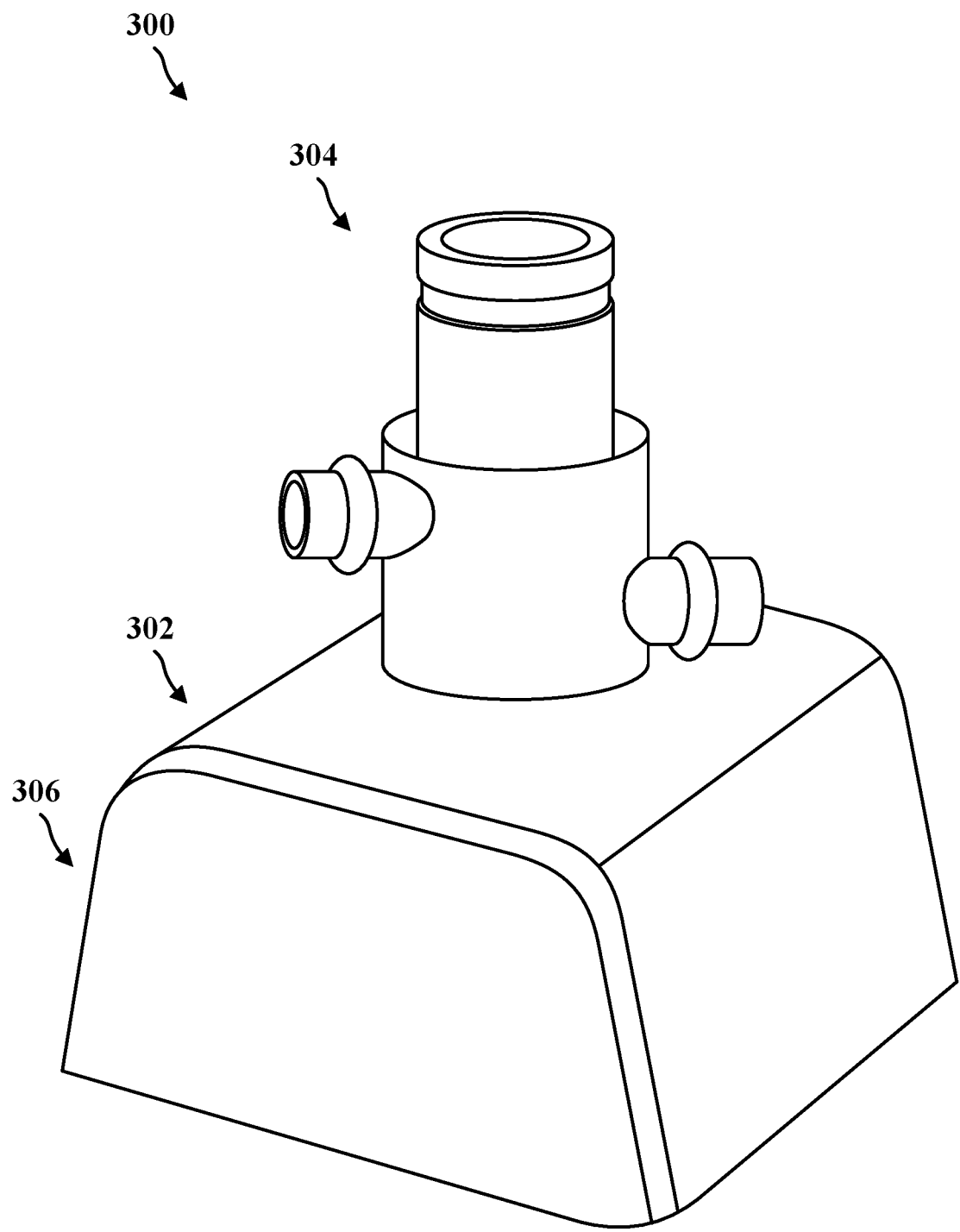
FIG. 3 is a diagram illustrating an example cast part and node.

FIG. 3 is a diagram 300 illustrating an example cast part 302 and node 304. The diagram 300 illustrates a node 304 attached to a mold 306 having a casting cavity. The node 304 may be fitted internal to the mold 306 (see, e.g., FIG. 5), or external. The node 304 may be a hybrid fit (see, e.g., FIG. 6), wherein a part of the node 304 may remain internal to the mold, while the other part would remain external during the casting process.

Figure 4:
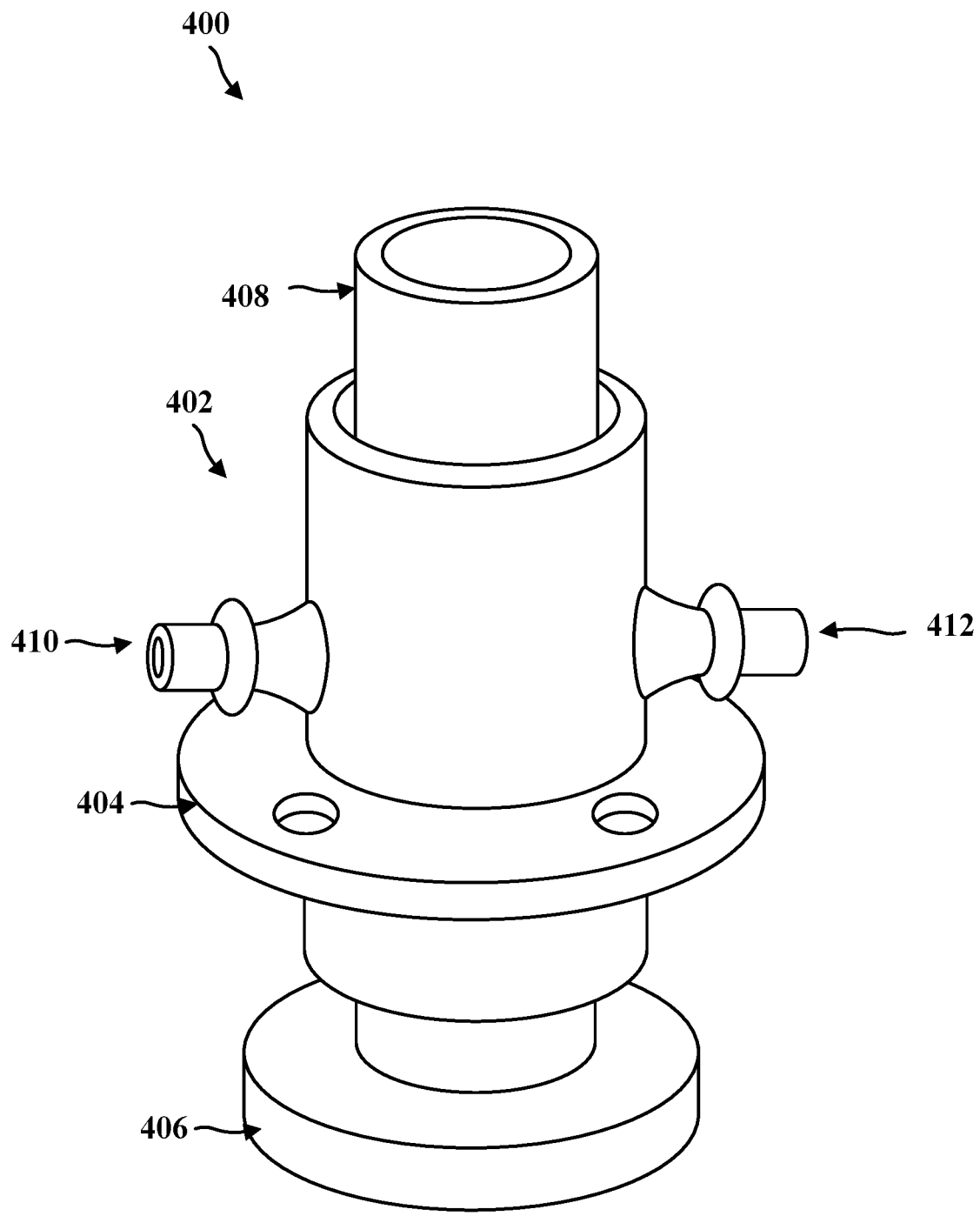
FIG. 4 is a diagram illustrating an example node that may be a casting mold.

FIG. 4 is a diagram illustrating an example node 400 that may be a co-casting. As illustrated, an additively manufactured component 402 may include co-cast components 406. The co-cast component 406 may in some aspects, form the node 400. The node 400 may be an additively manufactured node 402 that connects to other structures in a vehicle chassis or other higher level assembly (e.g., a tube 408). Other structures (e.g., a tube 408) may connect to the additively manufactured node 402. The other structures (e.g., a tube 408) may include structural tubes (carbon fiber composite, metal, alloys, and those made of other engineering materials), extrusions, panels, sheet metals, castings and other machined components (not illustrated). Machining may include milling, boring, tapping, grinding, or other types of machining.

The additively manufactured component 402 may be placed in a casting mold. (See FIGS. 5-7 for examples of casting molds.) In an aspect, the additively manufactured component 402 may be secured to the casting mold such that the node 400 (e.g., additively manufactured component 402) is constrained, e.g., unable to move or rotate during the casting process. For example, the additively manufactured component 402 may include a flange 404 with holes that may each receive a bolt or another mechanical fastening feature to mount the node 400 to another component (not shown) and/or to secure the additively manufactured component 402 to a mold (see FIG. 5-6).

In an aspect, the casting mold accepts the additively manufactured component 402). In an aspect, the additively manufactured component 402 may be an interface node. The node 400 (e.g., additively manufactured component 402) may be placed in a mold configured to accept the node 400 (e.g., additively manufactured components 402). The node 400 may have a co-casting region 410. The co-cast region 410 refers to the part of the node 400 that would cooperate with the casting cavity to form a part. The co-cast region 410 could be fins or fingers 412 extending into the cast cavity to increase the surface area of the joint between the node and the casting. These features, additionally, could serve as structures for optimal load or heat transfer into the cast part. Therefore, all the complexity could be built into the node while the casting could be a part with a simple geometry. Furthermore, the increased surface area of the node can improve the blend between the node and the cast part. The increased surface area may be provided by an engineered surface. The engineered surfaces may be shapes other than flat surfaces. Engineered surfaces may be provided in lieu of flat surfaces.

In an aspect for this process, the melting point/glass transition temperature (e.g., for plastics) of the node 400 (e.g., additively manufactured component 402) may be higher than that of the material being cast. In an aspect, the additively manufactured components 402 may be secured to the mold using mechanical fastening features.

In an aspect, the node may have stand-off tabs that would enable the node to be fixtured in place during the casting process. For example, the anti-rotation feature 408 may also function as a stand-off tab. The node may have other features for fixturing during the casting process. In an aspect, the other features may include pins (e.g., anti-rotation feature 408) or grooves 406 to accept pins/tongues. The pins/tongues may additionally serve as locating features to locate the node in the mold (e.g., either on the exterior of the mold or the interior).

The additively manufactured components 402 may be an Interface Node. As illustrated in FIG. 4, the additively manufactured components 402 includes the adhesive inlet port 410, the adhesive outlet port 412, and sealants. In an embodiment, the adhesive outlet port 412 may be connected to a negative pressure source (such as a vacuum source), to promote adhesive distribution during the injection process. In addition, grooves or other features may be provided on the additively manufactured components 402 (e.g., Interface Node) to accept sealants, and other isolators. Sealants may be used to provide a hermetically sealed enclosure for the adhesive introduction, and would further ensure the integrity of the adhesive once it has cured. Sealants also ensure that the additively manufactured components 402 and the component the additively manufactured components 402 is being connected to do not come under physical contact, thereby preventing potential galvanic corrosion issues. In some cases, features to accept isolators may be co-printed with the additively manufactured components 402. The isolators would ensure that the additively manufactured components 402 and the component being connected to the additively manufactured components 402 do not come in physical contact with each other, thereby preventing galvanic corrosion. In an aspect, nylon washers may be used as isolators.

While a node to tube 408 connection is illustrated on additively manufactured components 402, it will be appreciated by those skilled in the art that any connection feature may be present on the additively manufactured components 402, as mandated by the requirements of a particular design. For example, the additively manufactured components 402 (e.g., Interface Node) may have a node to panel connection feature or other types of connections.

Figure 5:
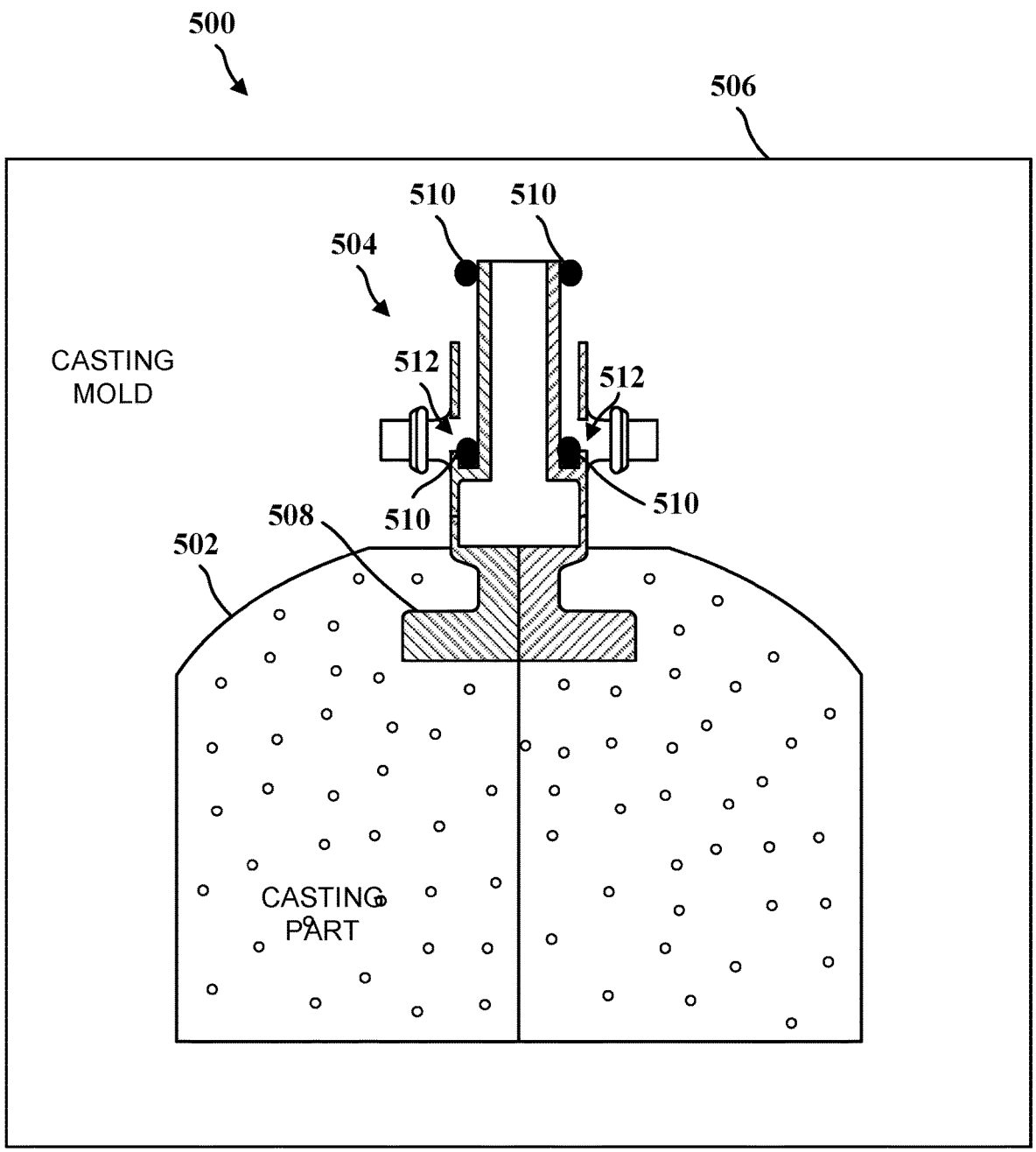
FIG. 5 is a diagram illustrating an example cast part and node in a casting mold.

FIG. 5 is a diagram illustrating an example component 500 including a cast part 502 and a node 504 in a casting mold 506. The node 504 may be fitted internal to the mold 506. As discussed above, features to connect the node 504 to the mold 506 may be additively manufactured with the node 504. The node 504 may have co-casting features 508 extending into the cast part 502. The casting process may involve a molten metal solidifying around the co-casting feature or features 508.

As illustrated in FIG. 5, the node 504 may include O-rings 510 to create a seal so that a vacuum may be drawn to cause adhesive to flow through channels 512 into the node 504 through adhesive inlet and outlet ports.

As described herein, Interface Nodes may includes adhesive inlet and outlet ports, and sealants. In an aspect, the adhesive outlet port may be connected to a negative pressure source (such as a vacuum source), to promote adhesive distribution during the injection process. In addition, grooves or other features may be provided on the Interface Node to accept sealants, and other isolators. Sealants may be used to provide a hermetically sealed enclosure for the adhesive introduction, and would further ensure the integrity of the adhesive once it has cured. Sealants also ensure that the Interface Node and the component it is being connected to do not come under physical contact, thereby preventing potential galvanic corrosion issues. In some cases, features to accept isolators may be co-printed with the Interface Node. The isolators would ensure that the Interface Node and the component being connected to the Interface Node do not come in physical contact with each other, thereby preventing galvanic corrosion. In an embodiment, nylon washers may be used as isolators.

While a node to tube connection is shown on this Interface Node at X, it would be appreciated by those skilled in the art that any connection feature may be present on the Interface Node, as mandated by the requirements. For example, the Interface Node could have a node to panel connection feature.

Figure 6:
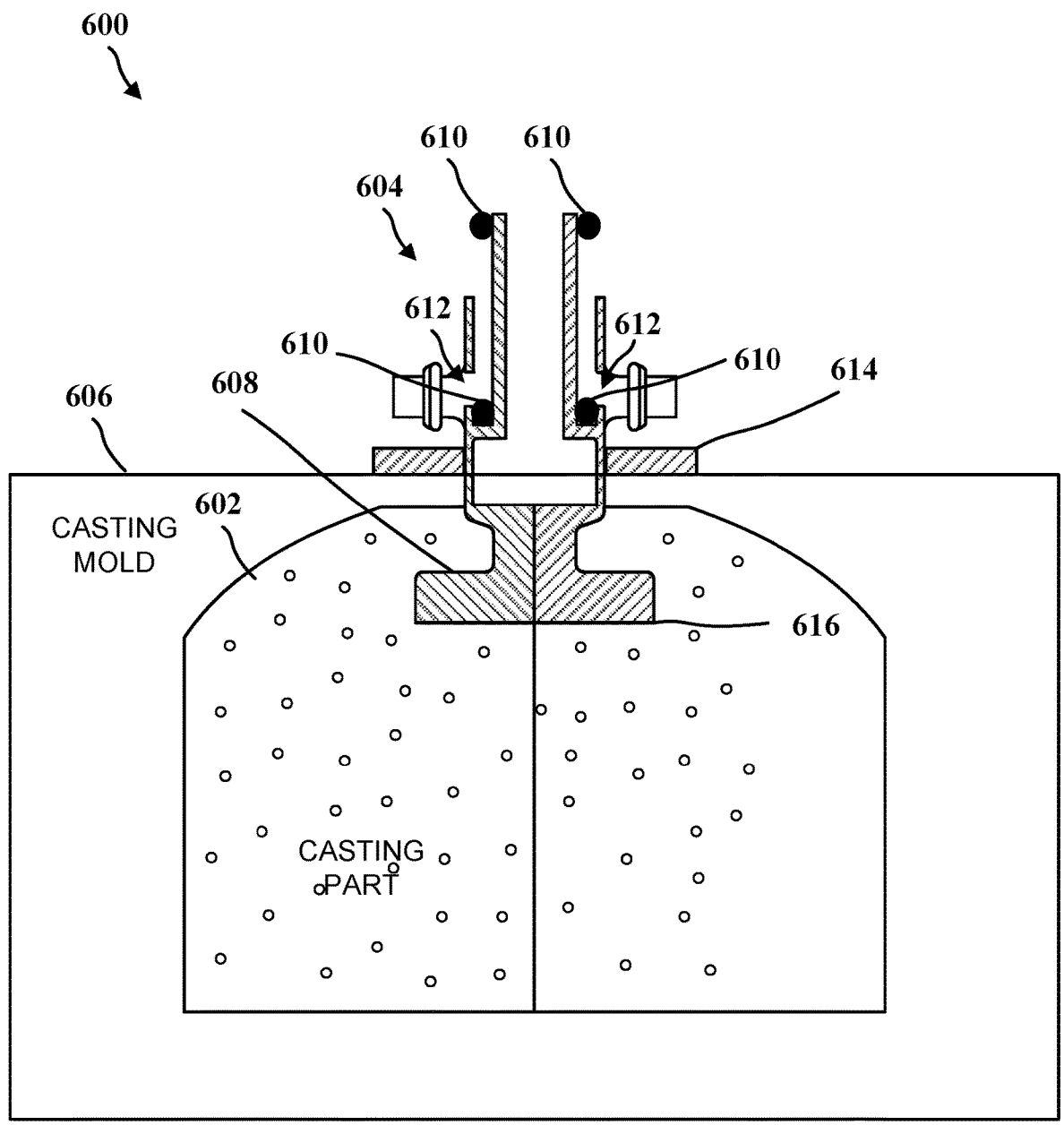
FIG. 6 is a diagram illustrating an example cast part and node in a casting mold.

FIG. 6 is a diagram illustrating an example component 600 including a cast part 602 and a node 604 in a casting mold 606. The node 604 may be fitted partially internal to the mold 606. For example, the node 604 may have co-casting features 608 extending into the cast part 502. The co-casting feature 608 may have an engineered surface at location 616. For example, in place of the flat surface at the location 616 illustrated in FIG. 5, an engineered surface such as engineered surfaces illustrated with respect to FIGS. 8A-8E discussed below may be at the location 616. As discussed above, features to connect the node 604 to the mold 606 may be additively manufactured with the node 604. In an aspect, the casting process may involve a molten metal solidifying around the co-casting feature or features 608.

As illustrated in FIG. 6, the node 604 may include O-rings 610 to create a seal so that a vacuum may be drawn to cause adhesive to flow through channels 612 into the node 604 through adhesive inlet and outlet ports. Additionally, as illustrated in FIG. 6, the node 604 may include a flange 614. The flange 614 may be the same or similar to the flange 404 of FIG. 4. The flange 614 may include holes that may each receive a mechanical fastening feature to mount the node 400 to another component (not shown) and/or to secure the node 604 to a mold.

Figure 7:
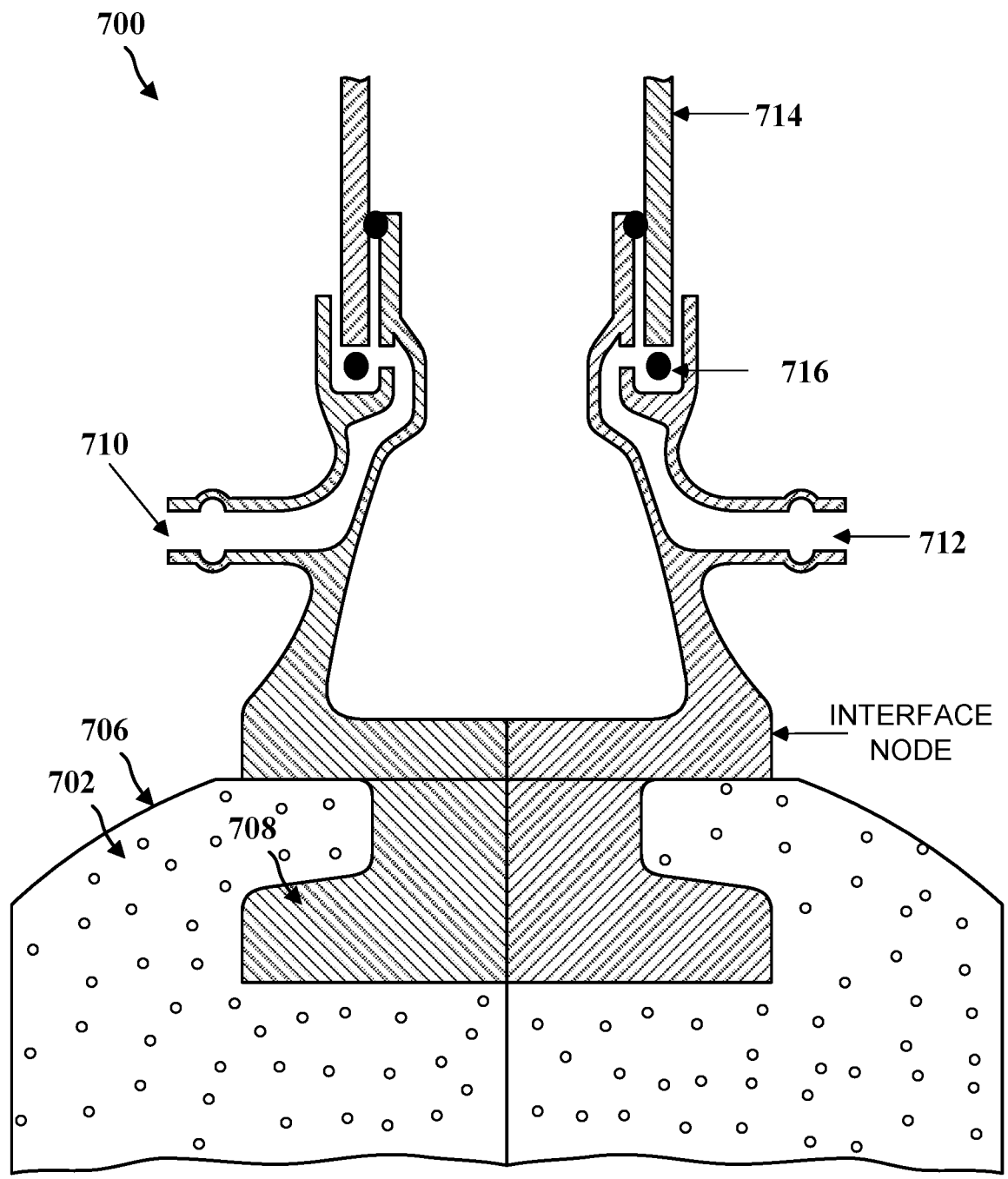
FIG. 7 is a diagram illustrating an example cutaway of a cast part and node in a casting mold.

FIG. 7 is a diagram illustrating an example cutaway of a component 700 including a cast part 702 and a node 704 in a casting mold 706. As discussed above with respect to FIG. 5, the node 704 may be fitted partially internal to the mold 706. For example, the node 704 may have co-casting features 708 extending into the cast part 702. As discussed above, features to connect the node 704 to the mold 706 may be additively manufactured with the node 704. In an aspect, the casting process may involve a molten metal solidifying around the co-casting feature or features 708. The co-casting feature 708 may be a flat surface (as illustrated in FIGS. 5-6) or may be an engineered surface. Example engineered surfaces are illustrated in FIGS. 8A-8E.

In an aspect, the node 704 may be an interface node. The node 704 may include an adhesive port 710 and a vacuum port 712. The interface node may provide an interface to a tube 716. The tube 716 and the interface node (node 704) may provide a sealable connection using O-rings 716, which would be placed in grooves co-printed with the Interface Node.

Figure 8A:
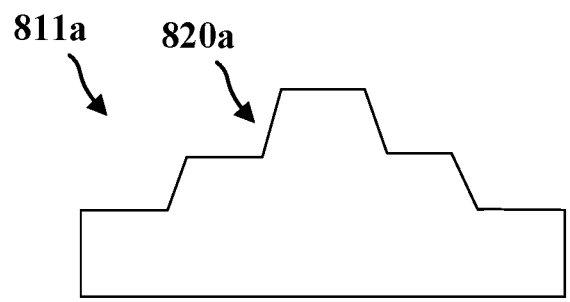
FIG. 8A is a front view of an Interface Node having a flat upper region for DED deposition.

FIG. 8A is a close up view of Interface Nodes 811a having an engineered surface at a co-casting region, e.g., the area of the interface node where the co-casting occurs. In accordance with this embodiment, the surfaces of the Interface Nodes 811a have been additively manufactured to include complex engineered surfaces 820a.

Figure 8B:
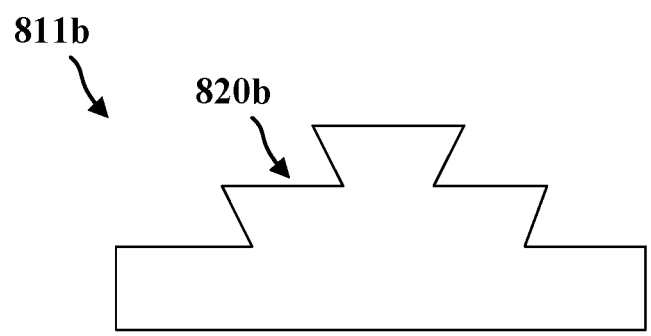
FIG. 8B is a cross-sectional view of a portion of an Interface Node having an engineered surface.

FIG. 8B is a close up view of Interface Nodes 811b having an engineered surface at a co-casting region, e.g., the area of the interface node where the co-casting occurs. In accordance with this embodiment, the surfaces of the Interface Nodes 811b have been additively manufactured to include complex engineered surfaces 820b.

Figure 8C:
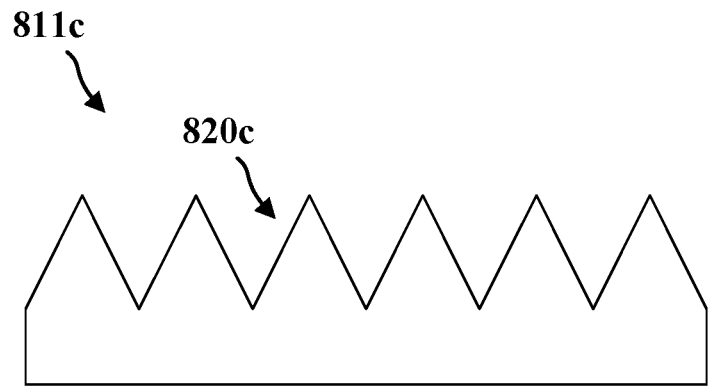
FIG. 8C is a cross-sectional view of a portion of an Interface Node having an alternative engineered surface.

FIG. 8C is a close up view of Interface Nodes 811c having an engineered surface at a co-casting region, e.g., the area of the interface node where the co-casting occurs. In accordance with this embodiment, the surfaces of the Interface Nodes 811c have been additively manufactured to include complex engineered surfaces 820c.

Figure 8D:
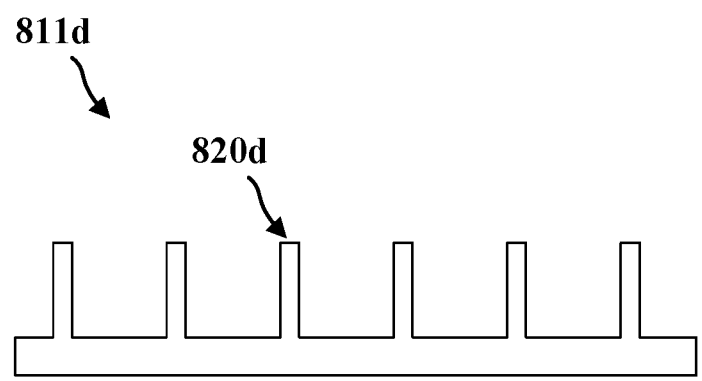
FIG. 8D is a cross-sectional view of a portion of an Interface Node having another alternative engineered surface.

FIG. 8D is a close up view of Interface Nodes 811d having an engineered surface at a co-casting region, e.g., the area of the interface node where the co-casting occurs. In accordance with this embodiment, the surfaces of the Interface Nodes 811d have been additively manufactured to include complex engineered surfaces 820d.

Figure 8E:
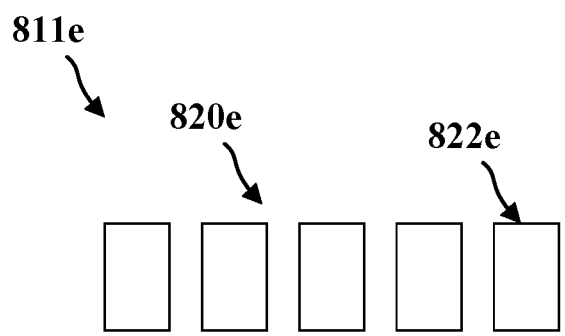
FIG. 8E is a cross-sectional view of a portion of an Interface Node having yet another alternative engineered surface.

FIG. 8E is a close up view of Interface Nodes 811e having an engineered surface at a co-casting region, e.g., the area of the interface node where the co-casting occurs. In accordance with this embodiment, the surfaces of the Interface Nodes 811e have been additively manufactured to include complex engineered surfaces 820e.

In an aspect, the engineered surfaces illustrated in FIGS. 8A-8E may each be configured to significantly improve a connection between the Interface Nodes 811a-811e and a cast part (502, 602, 702). The engineered surfaces may be fingers 822e that may provide an increased surface area for the casting (cast part 502, 602, 702) to interface with the Interface Node. Increasing surface area may improve the blend between the node (e.g., interface node 811e) and the cast part 502, 602, 702. Furthermore, in embodiments where the melting point of the interface node 811a-811e is not significantly higher or the melting point of the interface node 811a-811e is similar to that of the casting (e.g., the cast part 502, 602, 702), the engineered surfaces may melt and solidify within what may be a higher strength interface node 811e material. Other embodiments may use a higher strength material as an interface node 811e. The strength requirements of the interface between the interface node 811e and the casting (e.g., the cast part 502, 602, 702) may mandate the use of a higher strength material.

Figure 9:
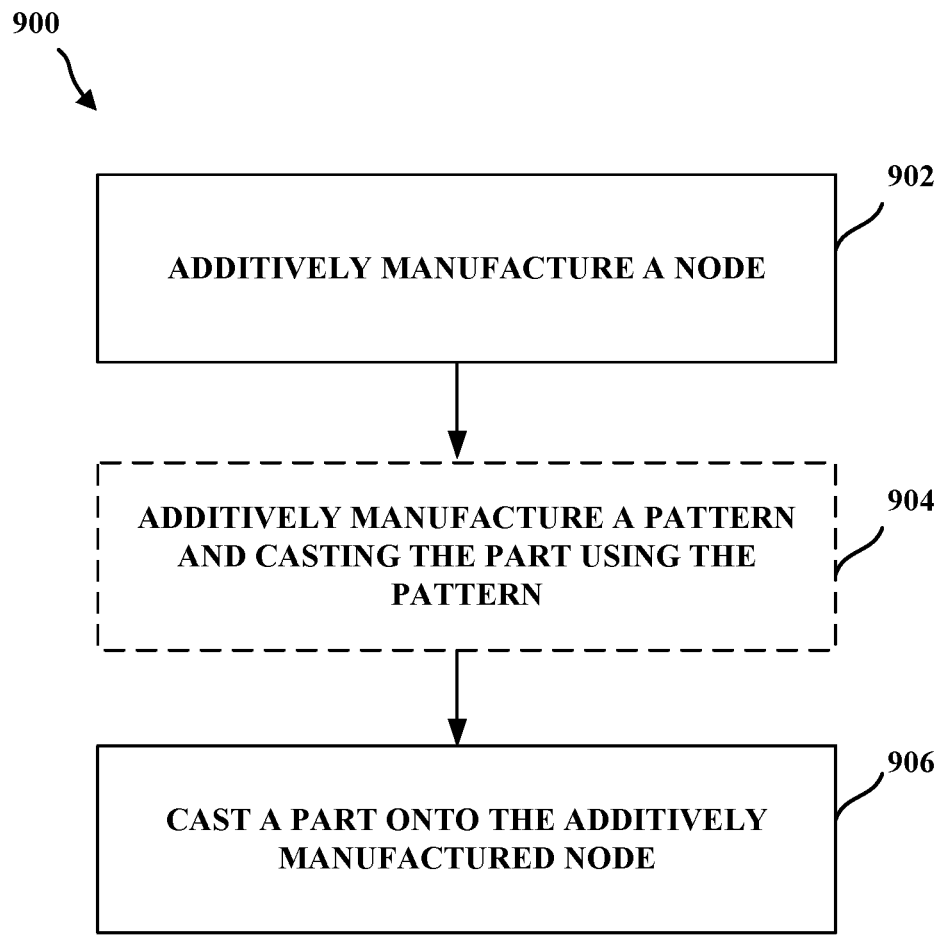
FIG. 9 is a flowchart illustrating an example method in accordance with the systems and methods described herein.

FIG. 9 is a flowchart 900 illustrating an example method in accordance with the systems and methods described herein. At block 902, manufacture, e.g., additively manufacture, a node. For example, additively manufacture a node (202, 304, 402, 504, 604, 704). In an aspect, the additively manufactured node (202, 304, 402, 504, 604, 704) may include an interface node 811a-811e.

In another aspect, forming the additively manufacturing the interface node may include forming at least one of a node-to-tube connection, node-to-extrusion connection, or a node-to-panel connection.

At block 904, (optional) the method may include additively manufacturing a pattern such as a mold 506, 606. A part may be cast using the pattern, e.g., the mold 506, 606. For example, the method may include additively manufacturing a pattern such as a mold 506, 606. A part may be cast using the pattern, e.g., the mold 506, 606. For example, block 906 may, in some examples, be performed using the pattern, e.g., the mold 506, 606, additively manufacturing at block 904.

At block 906, cast a part onto the additively manufactured node. For example, casting a part (e.g., cast part 502, 602, 702) onto the additively manufactured node (202, 304, 402, 504, 604, 704). In an aspect, an additively manufactured node (202, 304, 402, 504, 604, 704) may be placed in a mold (506, 606). The additively manufactured node (202, 304, 402, 504, 604, 704) may be entirely contained by the mold (506). Alternatively, the additively manufactured node (202, 304, 402, 504, 604, 704) may be partially contained by the mold (606). Material may be added to the mold (506, 606) to create the casting, e.g., the cast part 502, 602, 702. In an aspect, the cast part 502, 602, 702 may be aluminum and the additively manufactured node (202, 304, 402, 504, 604, 704) may include one of steel or titanium. The additively manufactured node (202, 304, 402, 504, 604, 704) and the cast part 502, 602, 702 may form a single co-cast part (e.g., component 500, 600, 700). The additively manufactured node (202, 304, 402, 504, 604, 704) may include an engineered surface that may form a connection to the cast part.

An aspect may include means for additively manufacturing a node, e.g., (as illustrated in FIG. 1A-1D). An aspect may include means for casting a part onto the additively manufactured node, e.g., as illustrated in FIGS. 2 and 4.

The previous description is provided to enable any person skilled in the art to practice the various aspects described herein. Various modifications to these exemplary embodiments presented throughout this disclosure will be readily apparent to those skilled in the art, and the concepts disclosed herein may be applied to apparatus for co-casting of interface nodes with 3-D printed components. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   an additively manufactured node having a co-cast feature;
   a casting mold; and
   a cast part contained in the casting mold, the cast part cast around at least a first portion of the additively manufactured node including the co-cast feature, wherein the co-cast feature cooperates with the cast part to form a hybrid part including the first portion of the additively manufactured node and the cast part, and
   wherein the co-cast feature is internal to the casting mold and a second portion of the additively manufactured node is external to the casting mold.

2. The apparatus of claim 1, wherein the additively manufactured node comprises an interface node.

3. The apparatus of claim 2, wherein the interface node comprises at least one of a node-to-extrusion connection, node-to-panel connection, or a node-to-tube connection.

4. The apparatus of claim 1, wherein the additively manufactured node is configured to have a melting point that is higher than a melting point of the cast part.

5. The apparatus of claim 1, wherein the additively manufactured node comprises a first material having a higher strength than a second material of the cast part.

6. The apparatus of claim 1, wherein the co-cast feature further comprises an engineered surface having a non-flat surface that provides an increased surface area within the cast part.

7. The apparatus of claim 1, wherein the cast part is cast around the at least first portion of the additively manufactured node using a casting tool.

8. The apparatus of claim 1, wherein the additively manufactured node further comprises an anti-rotation feature located at and engaging with an external surface of the cast part.

9. The apparatus of claim 1, wherein the additively manufactured node further comprises an interface surface and a sealant covering the interface surface, wherein the interface surface is configured to receive a component part connectable with the additively manufactured node, and wherein the sealant is configured to separate the interface surface and the component part from physical contact upon connection of the component part to the additively manufactured node.

10. The apparatus of claim 1, wherein the additively manufactured node has a first structural complexity greater than a second structural complexity of the cast part.

11. The apparatus of claim 1, wherein the additively manufactured node and the cast part are connected such that a portion of the additively manufactured node extends outside of the cast part.

12. The apparatus of claim 1, wherein the additively manufactured node further comprises a flange secured to an external surface of the casting mold.

13. The apparatus of claim 12, wherein the flange is secured to the external surface of the casting mold by one or more mechanical fastening features.

14. A method, comprising:
    additively manufacturing a node having a co-cast feature; and
    casting a part contained in a casting mold, the cast part cast around at least a first portion of the additively manufactured node including the co-cast feature, wherein the co-cast feature cooperates with the cast part to form a hybrid part including the first portion of the additively manufactured node and the cast part,
    wherein the co-cast feature is internal to the casting mold and a second portion of the additively manufactured node is external to the casting mold.

15. The method of claim 14, wherein the additively manufactured node comprises an interface node.

16. The method of claim 14, wherein additively manufacturing the interface node comprises forming at least one of a node-to-extrusion connection, node-to-panel connection, or a node-to-tube connection.

17. The method of claim 14, wherein the additively manufactured node is configured to have a melting point that is higher than a melting point of the cast part.

18. The method of claim 14, wherein the additively manufactured node comprises a first material having a higher strength than a second material of the cast part.

19. The method of claim 14, further comprising additively manufacturing the node with the co-cast feature having an engineered surface having a non-flat surface that provides an increased surface area within the cast part.

20. The method of claim 14, wherein the additively manufactured node further comprises an anti-rotation feature located at and engaging with an external surface of the cast part.

21. The method of claim 14, wherein the additively manufactured node further comprises a groove for a sealant.

22. The method of claim 14, wherein the casting mold is fixtured to the node using a mechanical fastener.

\* \* \* \* \*